US010214451B2

(12) United States Patent
Pyzik et al.

(10) Patent No.: US 10,214,451 B2
(45) Date of Patent: Feb. 26, 2019

(54) CEMENT AND SKINNING MATERIAL BASED ON A WATER-SWELLABLE CLAY, AND METHOD FOR PRODUCING SEGMENTED OR SKINNED CERAMIC HONEYCOMB STRUCTURES

(71) Applicant: Dow Global Technologies LLC, Midland, MI (US)

(72) Inventors: Aleksander J. Pyzik, Midland, MI (US); Sharon Allen, Midland, MI (US); Peter C. Saucier, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 496 days.

(21) Appl. No.: 14/362,483

(22) PCT Filed: Dec. 10, 2012

(86) PCT No.: PCT/US2012/068832
§ 371 (c)(1),
(2) Date: Jun. 3, 2014

(87) PCT Pub. No.: WO2013/090214
PCT Pub. Date: Jun. 20, 2013

(65) Prior Publication Data
US 2014/0319742 A1    Oct. 30, 2014

Related U.S. Application Data

(60) Provisional application No. 61/570,925, filed on Dec. 15, 2011.

(51) Int. Cl.
| C04B 28/00 | (2006.01) |
| C04B 37/00 | (2006.01) |
| C04B 35/185 | (2006.01) |
| C04B 38/00 | (2006.01) |
| B29L 31/60 | (2006.01) |

(52) U.S. Cl.
CPC .......... *C04B 28/001* (2013.01); *C04B 35/185* (2013.01); *C04B 37/00* (2013.01); *C04B 37/005* (2013.01); *C04B 38/0006* (2013.01); *B29L 2031/608* (2013.01)

(58) Field of Classification Search
CPC ..... C04B 28/001; C04B 35/185; C04B 37/00; C04B 37/005; C04B 38/0006
See application file for complete search history.

(56) References Cited

U.S. PATENT DOCUMENTS

| 4,652,286 A | 3/1987 | Kusuda et al. |
| 5,098,455 A | 3/1992 | Doty et al. |
| 5,173,349 A | 12/1992 | Yavuz et al. |
| 5,194,154 A | 3/1993 | Moyer et al. |
| 5,198,007 A | 3/1993 | Moyer et al. |
| 5,322,537 A | 6/1994 | Nakamura et al. |
| 5,340,516 A | 8/1994 | Yavuz et al. |
| 6,306,335 B1 | 10/2001 | Wallin et al. |
| 6,596,665 B2 | 7/2003 | Wallin et al. |
| 6,669,751 B1 | 12/2003 | Ohno et al. |
| 6,797,666 B2 | 9/2004 | Harada et al. |
| 7,112,233 B2 | 9/2006 | Ohno et al. |
| 7,384,441 B2 | 6/2008 | Ito et al. |
| 7,488,412 B2 | 2/2009 | Abe et al. |
| 7,666,240 B2 | 2/2010 | Ohno et al. |
| 2001/0038810 A1 | 11/2001 | Wallin et al. |
| 2004/0020359 A1 | 2/2004 | Koermer et al. |
| 2004/0231307 A1 | 11/2004 | Wood et al. |
| 2008/0138568 A1 | 6/2008 | Tomita et al. |
| 2009/0239030 A1* | 9/2009 | Cai .......... C04B 28/24 428/116 |
| 2010/0115899 A1 | 5/2010 | Lee et al. |
| 2010/0247851 A1* | 9/2010 | Miyata .......... B01J 35/04 428/116 |

FOREIGN PATENT DOCUMENTS

| WO | 2003051488 A1 | 6/2003 |
| WO | 03082773 A1 | 10/2003 |
| WO | 2004011124 A1 | 2/2004 |
| WO | 2004011386 A1 | 2/2004 |
| WO | 2013048850 A1 | 4/2013 |

OTHER PUBLICATIONS

Reed, J., Introduction to the Principles of Ceramic Processing, John Wiley and Sons, NY 1988, Chapters 10-12.
Reed, J., Introduction to the Principles of Ceramic Processing, John Wiley and Sons, NY, 1988, Chapters 10-12, Parts 1 and 2, pp. 132-165 and 166-182.

* cited by examiner

*Primary Examiner* — Shuangyi Abu Ali
(74) *Attorney, Agent, or Firm* — The Dobrusin Law Firm, P.C.

(57) ABSTRACT

Skins and/or adhesive layers are formed on a porous ceramic honeycomb by applying a layer of a cement composition to a surface of the honeycomb and firing the cement composition. The cement composition contains a water-swellable clay, high aspect inorganic filler particles and water, and are nearly or completely devoid of particles smaller than 100 nm and a cellulosic polymer.

19 Claims, No Drawings

CEMENT AND SKINNING MATERIAL BASED ON A WATER-SWELLABLE CLAY, AND METHOD FOR PRODUCING SEGMENTED OR SKINNED CERAMIC HONEYCOMB STRUCTURES

The present invention relates to cement and skinning materials for ceramic filters, as well as to methods for applying skins to ceramic filters and to methods for assembling segmented ceramic filters.

Ceramic honeycomb-shaped structures are widely used in applications such as emission control devices, especially in vehicles that have internal combustion engines. These structures also are used as catalyst supports. The honeycomb structures contain many axial cells that extend the length of the structure from an inlet end to an outlet end. The cells are defined and separated by porous walls that also extend along the longitudinal length of the structure. Individual cells are capped off at the inlet end or the outlet end to form outlet or inlet cells, respectively. Inlet cells are at least partially surrounded by outlet cells, and vice versa, usually by arranging the inlet and outlet cells in an alternating pattern. During operation, a gas stream enters the inlet cells, passes through the porous walls and into the outlet cells, and is discharged from the outlet end of the outlet cells. Particulate matter and aerosol droplets are captured by the walls as the gas stream passes through them.

These honeycomb structures often experience large changes in temperature as they are used. One specific application, diesel particulate filters, is illustrative. Ceramic honeycomb structures that are used as diesel particulate filters will experience temperatures that can range from as low as −40° C. to as much as several hundred ° C. during the normal operation of the vehicle. In addition, these diesel particulate filters are periodically exposed to even higher temperatures during a "burn-out" or regeneration cycle, when trapped organic soot particles are removed via high temperature oxidation. The thermal expansion and contraction that accompany these temperature changes create significant mechanical stresses within the honeycomb structure. The parts often exhibit mechanical failure as a result of these stresses. The problem is especially acute during "thermal shock" events, when large and rapid temperature changes create large temperature gradients within the honeycomb structure. Therefore, the ceramic honeycomb structures for use in these applications are designed to provide good thermal shock resistance.

One of the ways of improving thermal shock resistance in a ceramic honeycomb is to segment it. Instead of forming the entire honeycomb structure from a single, monolithic body, a number of smaller honeycombs are made separately, and then assembled into a larger structure. An inorganic cement is used to bond the smaller honeycombs together. The inorganic cement is in general more elastic than are the honeycomb structures. It is this greater elasticity that allows thermally-induced stresses to dissipate through the structure, reducing high localized stresses that might otherwise cause cracks to form. Examples of the segmenting approach are seen in U.S. Pat. Nos. 7,112,233, 7,384,441, 7,488,412, and 7,666,240.

Skinning is another way of improving thermal shock resistance. The periphery of the honeycomb tends to experience the largest thermally-induced stresses. Because of this, crack formation tends to be prevalent there. To counteract this, it is common to remove the periphery of the as-extruded honeycomb, and to replace it with a skin material that is more elastic.

The cements and skinning materials contain inorganic binders, which form an amorphous binding phase when fired, together with one or more inorganic fillers. The inorganic binders are typically colloidal silica, colloidal alumina, or some combination of these. These colloidal materials are characterized by their extremely small particle size (smaller than 250 µm, generally smaller than 100 µm). These form a binding phase when the cement or skinning composition is fired, and hold the filler particles together. In addition, a water-soluble cellulosic polymer is usually present to help control the rheological properties of the wet cement and keep water from separating.

A significant problem with these cement and skinning materials is that the inorganic binders easily penetrate into and through the cell walls of the honeycomb. A small amount of penetration is needed to ensure good adhesion, but excessive penetration leads to several adverse effects. The peripheral walls become denser because the pores become filled with cement. These denser walls act as heat sinks; they change temperature more slowly than other portions of the structure, and for that reason promotes the formation of large temperature gradients within the structure. In addition, the inorganic binders frequently permeate through the adjacent wall of the honeycomb structure, into the cells and even into internal walls. Less gas can flow through cells that become narrowed or blocked due to the permeation of the cement into them; this too leads to higher temperature gradients forming within the structure. These temperature gradients promote cracking and failure. Thus, to some extent, the benefits of applying a more elastic skin or cement are counteracted by the greater thermal gradients that form. The narrowing and blocking also reduce the operating capacity of the filter.

One way to ameliorate these problems is to coat the honeycomb with a barrier coating (such as an organic polymer layer, which burns off during the firing step) before the cement or skinning material is applied. Another way is to increase the viscosity of the cement composition. Each approach has disadvantages, such as adding processing steps (and associated costs), increasing the drying time needed to cure the cement, and causing cracking and defects in the cement layer.

The cellulosic polymer causes other problems. The viscosity of a solution of these polymers is highly temperature-dependent. Therefore, large swings in the viscosity of the wet cement are seen even with small changes in its temperature. This leads to inconsistency in processing, especially when the solution is processed using automated and/or robotic equipment. This problem can be overcome through careful temperature control, but such close temperature control requires one to implement measures that are expensive to install and operate in an industrial environment.

A better cement and skinning material for these honeycomb structures is wanted. Such a material would adhere well to the honeycomb without excessive penetration. It should be easily processable over a range of temperatures. In addition, the cement and skinning material needs to have an acceptable resistance to thermal shock and good green strength. It should dry without cracking significantly.

This invention is an uncured inorganic cement composition comprising:

a) 1 to 18% by weight of a water-swellable clay;
b) 20 to 70% by weight of non-water-swellable, non-fugitive, inorganic filler particles that have an equivalent diameter of greater than 250 nm;
c) 20 to 60% by weight of water;

d) 0 to 0.1% by weight of a water-soluble cellulosic polymer; and e) 0 to 1% by weight of inorganic particles having an equivalent diameter of 100 nm or less.

The invention is also a method of forming a honeycomb structure comprising: (a) forming a layer of the uncured inorganic cement composition of the invention on at least one surface of a ceramic honeycomb having porous walls and then (b) firing the uncured inorganic cement composition and the ceramic honeycomb to form a cured cement layer on said at least one surface of the ceramic honeycomb.

The cured cement layer may form an adhesive layer between segments of a segmented honeycomb structure, a skin layer, or both.

The cement composition of the invention provides many advantages. It has very favorable rheological properties, despite the substantial or even total absence of a water-soluble cellulosic polymer. The water and water-swellable clay form an easily workable medium in which the inorganic filler particles can remain stably dispersed over extended periods. Neither the water nor the inorganic filler particles separates easily from the composition during storage. Therefore, the cement composition is highly storage stable. The viscosity of the cement composition is not highly sensitive to temperature and for this reason careful control over the temperature of the cement composition is not needed. The cement composition therefore is easily processable on automated and/or robotic equipment. The viscosity of the cement composition is easily adjusted if needed through small changes in the water content and/or the addition of an organic thickener. The cement composition can be formulated to be, for example, self-spreading (as is often wanted for skinning materials) or self-supporting (as is wanted as a cement layer for segmented honeycombs). A significant advantage of the invention is that the cement compositions are self-supporting even when they have low viscosities under shear, as described more fully below.

Once applied, the cement composition permeates the adjacent ceramic honeycomb walls only to a small extent, sufficient to provide good adhesion, without permeating easily through the walls into adjacent cells or into interior honeycomb walls. The composition resists migration under vacuum, and so initial drying can be performed easily by drawing a vacuum through the filter. The composition exhibits low shrinkage during drying. When dried at elevated temperatures such as 50 to 250° C., the cement composition of the invention is very resistant to cracking.

The dried cement composition has sufficient green strength that parts can be handled and manipulated easily. Once the composition is fired, the cured cement exhibits favorable strength, modulus and resistance to thermal shock. These properties can be tailored to application-specific needs through adjustments in the relative proportions of the ingredients within the aforementioned ranges, and through the selection of the inorganic filler particles. For example, the coefficient of thermal expansion (CTE) of the fired cement composition is also easily adjustable through the selection inorganic filler particles. This allows the CTE of the fired cement composition to be matched easily to that of the underlying ceramic honeycomb.

The water-swellable clay is a natural or synthetic clay that, when contacted with water, absorbs the water and expands. Water-swellability is conveniently evaluated by adding 2 grams of the clay in small (0.1 to 0.5 g) increments to 50 mL of room temperature distilled water. A water-swellable clay will absorb water and expand to a volume of at least 10 mL on this test. A preferred water-swellable clay will expand to a volume of at least 15 mL, or at least 18 mL. The water-swellable clay may expand to a volume of 30 mL or more on this test. By contrast, a non-water-swellable inorganic material absorbs little or no water on this test and will swell (if at all) to a volume of less than 10 mL, and most typically will swell to a volume of less than 4 mL.

Examples of water-swellable clays include montmorillonite clays such as bentonite and laponite. Bentonite clay is preferred.

The water-swellable clay is provided in the form of a particulate, which may be agglomerates of smaller primary particles. These water-swellable clay particles may have a mass median diameter (d50) of at least 5 µm, more typically 10 to 75 µm or 25 to 50 µm. These and other particles sizes described herein are conveniently measured using laser particle size analyzers such as those marketed by Cilas US.

The water-swellable clay constitutes 1 to 18% of the weight of the uncured (wet) cement composition. More preferably, it constitutes 1 to 7% of the weight of the uncured (wet) cement composition. A most preferred amount is 1 to 5%.

The wet cement composition also contains 10 to 70% by weight non-water-swellable, non-fugitive inorganic filler particles that have an equivalent diameter of greater than 250 nm (i.e., a volume equivalent to that of a sphere having a diameter of 250 nm or less). The inorganic filler particles may be, for example, low (<5) aspect ratio particles, high (≥5, or ≥10) aspect ratio platelets and/or fibers, or some combination of these. Low aspect ratio inorganic filler particles may have equivalent diameters of up to 100 µm, preferably up to 20 µm, still more preferably up to 10 µm, even more preferably up to 5 µm and most preferably up to 3 µm. High aspect ratio platelets and/or fibers preferably have lengths of 10 micrometers up to 100 millimeters. In some embodiments, these high aspect ratio particles have longest dimensions of 10 micrometers to 1000 micrometers. In other embodiments, a mixture of high aspect ratio particles is used that includes shorter platelets or fibers having a length from 10 micrometers to 1000 micrometers and longer platelets or fibers having lengths of greater than 1 millimeter, preferably from greater than 1 to 100 millimeters. The high aspect ratio filler particles may have smallest dimensions (diameters in the case of fibers, thicknesses in the case of platelets) of 0.1 micrometer to about 20 micrometers.

The inorganic filler particles may be a mixture of low aspect ratio particles and high aspect ratio platelets and/or fibers.

A wide range of inorganic materials may be used as the inorganic filler particles, provided that the inorganic filler particles are non-water-swellable and non-fugitive. By "non-fugitive", it is meant that the particles do not form a gas (by volatilizing, decomposition and/or other chemical reaction) under the conditions at which the cement composition is fired. The inorganic filler materials may be amorphous, crystalline, or partly amorphous and partly crystalline. Examples of inorganic filler particles include, for example, alumina, boron carbide, boron nitride, silicon carbide, silicon nitride, titanium carbide, mullite, cordierite, zirconium silicate, zeolite, aluminum titanate, an amorphous silicate or aluminosilicate, a partially crystallized silicate or aluminosilicate, and the like. The particles also may be or include precursor materials that react under the firing conditions to produce one or more of these materials. Aluminosilicates may contain other elements such as rare earths, zirconium, alkaline earths, iron and the like; these may constitute as much as 40 mole % of the metal ions in the material. The inorganic filler particles, in particular any high aspect ratio particles, may include in some embodiments a low-biopersistent material. By "low-biopersistent", it is meant that the particles are exonerated from classification as a hazardous substance under at least one of the four methods allowed by the NOTA Q standard. The particles, especially any high aspect ratio products as may be present, preferably meet the exoneration criterion established in the short-term biopersistence by intratracheal instillation protocol specified in ECB/TM/25 rev. 7 (1998).

Fiber particles may contain some amount (such as up to 50% by weight or preferably up to 10% by weight) of "shot" material, which are non-fibrous particulate by-products of the fiber-forming process.

High aspect ratio filler particles (including any "shot" material that may be present) in some embodiments constitute 10 to 70 weight percent of the uncured (wet) cement composition. Within this range, higher proportions of the high aspect ratio filler particles correlates generally to higher green strength and higher calcined strength. A preferred amount of high aspect ratio filler particles is 10 to 45%, more preferably 10 to 30% and still more preferably 10 to 25% of the uncured (wet) cement composition. The preferred ranges often provide a good balance between adequate green strength and acceptable CTE in the calcined cement.

Mixtures of inorganic particles can be used. For example, a mixture of low aspect ratio particles and high aspect ratio inorganic filler particles may be desirable in some embodiments, to provide desirable strength and modulus properties to the fired cement. In some embodiments, mixtures of inorganic filler particles having different chemical compositions may be used, for example, to provide the fired cement composition with specific desirable attributes.

Mixtures of inorganic filler particles having different chemical compositions may be-used to adjust the CTE of the fired cement to closely match that of a ceramic honeycomb to which the cement composition is to be applied. For example, many inorganic fibers and platelets, such as the low-biopersistent materials described above, have CTEs that are higher than many ceramic honeycombs (such as acicular mullite, for example). In such a case, additional inorganic particles that have CTEs lower than that of the ceramic honeycomb can be provided. In preferred embodiments, the cement composition contains a mixture of (1) inorganic filler particles, in particular non-biopersistent fibers, having a CTE higher than that of the ceramic honeycomb material and (2) inorganic filler particles having a CTE lower than that of the ceramic honeycomb material, such that the fired cement composition has a CTE over the temperature range of 100° C.-600° C. that is within the range $CTE_{honeycomb}+1$ ppm/° C. to $CTE_{honeycomb}-5$ ppm, preferably $CTE_{honeycomb} \pm 1$ ppm, where $CTE_{honeycomb}$ is the coefficient of thermal expansion of the honeycomb to which the cement composition is applied. For example, such a mixture of inorganic filler particles may include non-biopersistent inorganic fibers and low aspect ratio silicon carbide, silicon nitride, mullite and/or cordierite particles (or precursors thereto).

In certain preferred embodiments, the inorganic filler particles include (1) low aspect ratio alumina particles, (2) high aspect ratio platelets and/or fibers and optionally (3) one or more auxiliary low aspect ratio inorganic particles, the auxiliary low aspect ratio particles being particles other than alumina or a water-swellable clay that preferably have a CTE equal to or lower than that of the ceramic honeycomb to which the cement composition is to be applied. In such preferred embodiments, the weight ratio of alumina to water-swellable clay may range from 0.1 to 4.0. A more preferred weight ratio of alumina to clay is 0.25 to 2.0 and still more preferred ratio is 0.3 to 1.0. The alumina and water-swellable clay combined preferably constitute 3 to 20 weight percent, more preferably from 3 to 15 weight percent and still more preferably from 3.5 to 10 weight percent, of the uncured (wet) cement composition. In such preferred embodiments, high aspect ratio filler particles (including any "shot" material that may be present) constitute 10 to 70 weight percent of the uncured (wet) cement composition. A preferred amount of high aspect ratio filler particles is 10 to 45%, more preferably 10 to 30% and still more preferably 10 to 25% of the uncured (wet) cement composition. In such preferred embodiments, the auxiliary inorganic particles constitute 1 to 40%, preferably 5 to 40%, more preferably 10 to 35% and still more preferably from 15 to 35% of the weight of the uncured (wet) cement composition.

Water constitutes from 20 to 60% by weight of the uncured (wet) cement composition. A preferred amount is from 25 to 50% by weight. A more preferred amount is from 30 to 45% by weight.

An advantage of the cement composition of the invention is that water-soluble cellulosic polymers are not needed to obtain useful rheological characteristics in the wet cement composition. Therefore, the uncured cement composition contains no more than 0.1% by weight of a water-soluble cellulosic polymer and preferably is devoid of a water-soluble cellulosic polymer.

Small particles in the cement composition can easily migrate into and through the walls of a ceramic honeycomb, and for that reason are present in small quantities if at all. Therefore, the uncured (wet) cement composition contains no more than 1% by weight of inorganic particles having an equivalent diameter of 100 nm or less (i.e., a volume equivalent to that of a sphere having a diameter of 100 nm or less). Preferably, the uncured cement composition contains no more than 1% by weight, more preferably no more than 0.25% by weight, of particles having an equivalent diameter of 250 nm or less. In particular, it is preferred that the cement composition is devoid of colloidal silica, colloidal alumina and other metal oxide sols. It is also preferred that the cement composition is devoid of ethyl silicate, water glass, silica polymer and aluminum phosphate.

Various optional materials may be present in the uncured cement composition. Among these are porogens, which are preferably present, as well as other materials such as thickeners, organic powders and/or fibers, and the like.

Porogens are materials specifically added to create voids in the dried cement. The presence of the voids tends to reduce the strength of the fired cement, which is often beneficial because a lower fracture strength is wanted in the skin and/or cement layers than the ceramic honeycomb segments. For this reason, it is preferred to include one or more porogens in the cement composition. Typically, these porogens are particulates of a material that decomposes, evaporates or in some way other way volatilizes away during the firing step to leave a void. Examples of useful porogens include wheat flour, wood flour, soy flour, potato starch, corn starch, corn meal, carbon particulates (amorphous or graphitic), cellulose powder, nut shell flour or combinations thereof. In some embodiments, enough of the porogen is present to provide the fired cement composition with a porosity of 20 to 90%, preferably 50 to 80% and more preferably 55 to 70%. These porosities are often achieved when the porogen constitutes from 5 to 30%, preferably from 10 to 25% and more preferably from 10 to 20% of the weight of the uncured (wet) cement composition.

The cement composition may also contain one or more water-soluble polymeric thickeners (other than a water-soluble cellulose ether). An example of such a thickener is a polymer of ethylene oxide having a molecular weight of from 400 to 10,000. If present, such a thickener may constitute from 0.05 to 5%, preferably from 0.25 to 3% of the weight of the uncured (wet) cement composition.

The cement composition may contain a carrier fluid in addition to the water, but this is generally not preferred and such an additional carrier fluid preferably is present, if at all, only in small quantities, such as up to 5% of the weight of the uncured (wet) cement composition. The additional carrier liquid may be, for example, one or more organic liquids such as alcohols, glycols, ketones, ethers, aldehydes, esters, carboxylic acids, carboxylic acid chlorides, amides, amines, nitriles, nitro compounds, sulfides, sulfoxides, sulfones, aliphatic, unsaturated aliphatic (including alkenes and alkynes) and/or aromatic hydrocarbons, or an organometallic compound.

Other components that may be present in the cement composition include additional carrier fluids, dispersants, deflocculants, flocculants, plasticizers, defoamers, lubricants and preservatives, such as those described in Chapters 10-12 of *Introduction to the Principles of Ceramic Processing*, J. Reed, John Wiley and Sons, NY, 1988.

Preferred and more preferred uncured (wet) cement compositions include the following:

| Ingredient | Preferred Composition | More Preferred Composition |
| --- | --- | --- |
| Bentonite Clay | 1-7 weight-% | 1-5 weight-% |
| Alumina | 0.25-2 parts by weight/part by weight bentonite clay | 0.3-1 parts by weight/part by weight bentonite clay |
| Bentonite plus Alumina | 3-15 weight-% | 3.5-10 weight-% |
| Inorganic fibers | 10-30 weight-% | 10-25 weight-% |
| Water | 25-50 weight-% | 30-45 weight-% |
| Auxiliary inorganic particles | 10-40 weight-% | 15-35 weight-% |
| Porogen | 10-25 weight-% | 10-20 weight-% |
| Poly(ethylene glycol) | 0-5 weight-% | 0.25-3 weight-% |

The uncured cement composition is conveniently made using simple mixing methods. It is generally preferable to mix the dry materials together and then combine the mixture with water. Mixing can be performed in any convenient manner, using a variety of hand or automated mixing methods. Any additional carrier fluid is conveniently combined with the water before the water is mixed with the dry materials. The carrier fluid preferably is at a pH of 5 to 10 or higher, more preferably 8 to 10, at the time it is combined with the dry materials, as this pH has been found to promote the dispersion of the alumina and water-swellable clay particles into the water.

Upon mixing the water with the dry materials, the water-swellable clay absorbs a portion of the water and forms a gel-like matrix in which the various particulate materials are dispersed. If air or other gas becomes entrained during the mixing process, the uncured cement composition often captures gas and becomes foamy in texture and easily compressible. The shear viscosity of the cement composition is typically in the range of 1-50 Pa·s, more typically from 3 to 45 Pa·s when measured by oscillating shear rheometry methods at 20° C., 1 rad/s oscillation and 5 MPa amplitude, as described further in the following examples. A unique rheological feature of the cement of this invention is that the cement is self-supporting, i.e., able to retain its shape under its own weight under no applied shear, even when the compositions have low viscosities. Cements of the invention that have viscosities as low as 4-5 Pa·s and up to 50 Pa·s or more tend to be self-supporting in this manner. Self-supporting behavior is indicated when 250-500 mL of the composition holds its shape and does not spread when poured out onto a flat, horizontal surface at 25° C. Lower viscosity cement compositions of the invention tend to be self-spreading. This behavior is quite different from that of conventional cement compositions that are based on colloidal silica and/or colloidal alumina. Those conventional cements compositions have consistencies close to that of water when they have viscosities as high as 10 Pa·s, and tend not to be self-supporting materials until their viscosities exceed 30 Pa·s. Because of the unusual rheological properties of the cement composition of the invention, it can be pumped, applied, spread and distributed over a surface very easily, without dripping or precipitation of the solids. When shear is removed, the cement of this invention rapidly redevelops a high shear storage modulus. The shear storage modulus G', measured in Pa using an oscillatory shear flow rheometer operated at 20° C., 1 rad/s oscillation and 5 MPa amplitude often exhibits an increase of two orders of magnitude or more within 30 seconds after shear is discontinued.

The composition in most cases will not drip or flow from a container which is held upside down, unless formulated with higher amounts of water. When the water content is somewhat high, a self-leveling composition can be prepared.

When bentonite clay and alumina are present in the mixture, it is believed that the level of the clay mainly controls the shear viscosity of the cement composition and the alumina affects the modulus and & yield stress under non-shear conditions.

As a result of these beneficial rheological properties, the cement composition can be used easily for both forming a peripheral skin as well as a cement layer for bonding individual honeycomb segments. The advantage of one formulation that can be used for both operations is lower cost and operational simplicity.

The uncured cement composition is in most cases storage stable, even at high water contents; it resists sedimentation of the solids and separation of water when stored at ambient temperatures.

Honeycomb structures are made using the cement composition by forming a layer of the uncured cement composition onto at least one surface of a ceramic honeycomb having porous walls. The uncured cement composition is then fired in one or more steps to form a cured cement layer. The thickness of the applied layer of the uncured cement composition cement layer may be, for example, from about 0.1 mm to about 10 mm.

In some embodiments, the cured cement composition forms a cement layer between segments of a segmented honeycomb structure. In such embodiments, the uncured cement composition is applied to at least one surface of a first honeycomb segment to form a layer. A second honeycomb segment is brought into contact with the layer such that the cement composition is interposed between the first and second honeycomb segment, and the assembly is then fired to convert some or all of the clay mineral to a binding phase that bonds the cement to the honeycomb segments to form the segmented honeycomb structure.

In other embodiments, the cured cement composition forms a peripheral skin on a honeycomb structure, which may be monolithic or segmented. In such a case, the uncured cement composition is applied to the periphery of the honeycomb structure to form a layer, which is then fired to form a ceramic skin. If the honeycomb structure in these embodiments is segmented, an uncured cement composition in accordance with the invention may also be used to bond together the segments of the honeycomb structure.

The ceramic honeycomb is characterized in having axially extending cells defined by intersecting, axially-extending porous walls. The ceramic honeycomb may contain, for example, from about 20 to 300 cells per square inch (about 3 to 46 cells/cm$^2$) of cross-sectional area. The pore size may be, for example, from 1 to 100 microns (µm), preferably from 5 to 50 microns, more typically from about 10 to 50 microns or from 10 to 30 microns. "Pore size" is expressed for purposes of this invention as an apparent volume average pore diameter as measured by mercury porosimetry (which assumes cylindrical pores). The porosity, as measured by immersion methods, may be from about 30% to 85%, preferably from 45% to 70%.

The ceramic honeycomb may be any porous ceramic that can withstand the firing temperature (and use requirements), including, for example, those known in the art for filtering diesel soot. Exemplary ceramics include alumina, zirconia, silicon carbide, silicon nitride and aluminum nitride, silicon oxynitride and silicon carbonitride, mullite, cordierite, beta spodumene, aluminum titanate, strontium aluminum silicates, lithium aluminum silicates. Preferred porous ceramic bodies include silicon carbide, cordierite and mullite or combination thereof. The silicon carbide is preferably one as described in U.S. Pat. No. 6,669,751B1, EP1142619A1 or WO 2002/070106A1. Other suitable porous bodies are described in U.S. Pat. No. 4,652,286; U.S. Pat. No. 5,322,537; WO 2004/011386A1; WO 2004/011124A1; US 2004/0020359A1 and WO 2003/051488A1.

A mullite honeycomb preferably has an acicular microstructure. Examples of such acicular mullite ceramic porous bodies include those described by U.S. Pat. Nos. 5,194,154; 5,173,349; 5,198,007; 5,098,455; 5,340,516; 6,596,665 and 6,306,335; U.S. Patent Application Publication 2001/0038810; and International PCT publication WO 03/082773.

The firing step typically is performed at a temperature of at least about 600° C., at least about 800° C., or at least about 900° C. to at most about 1500° C., 1300° C., or 1100° C. or 950° C. Higher firing temperatures may result in increased fracture strength; in some cases this may be undesirable and a lower firing temperature, such as from 800 to 1000° C. or 900 to 950° C. may be preferred.

The firing step may be preceded by a preliminary drying step conducted at a temperature below 500° C., such as from 50 to 250° C., during which some or all of the carrier fluid is removed. The organic materials may be removed during this step as well, if the temperature is high enough. This drying step produces a "green body" in which the dried cement needs to have enough strength to permit the green body to be handled. For this reason, the cement composition of the invention preferably has a green strength, measured in accordance with the procedure described in Example 1, of at least 0.5 MPa and preferably at least 0.75 MPa. This green strength may in some cases be as much as 2 MPa.

One convenient way of performing the drying step is to pass a hot gas through the filter, typically by pulling a vacuum on the filter and allowing the gas to flow through the skin and/or cement layers and through and out of the honeycomb.

If any organic materials are not removed during the drying step, they can be removed in a separate heating step before the firing step, or they can be removed during the firing step.

An advantage of the invention is that cement composition is very resistant to cracking during such a preliminary drying step.

The manner of performing the firing step (and any preliminary heating step, if performed) is not considered to be critical provided that the conditions do not cause the honeycomb(s) to thermally deform or degrade.

It has been found that cement compositions as described herein do not permeate into the porous walls of the ceramic honeycombs as much as cement compositions that contain colloidal alumina and/or colloidal silica binders, even when a vacuum drying step is performed. Because of this reduced permeation, the honeycomb walls adjacent to the cement layer do not become impregnated with the cement to the same extent as when colloidal alumina and/or colloidal binders are instead used as the binder. The porosity of the walls is therefore not reduced as much, and the higher porosity walls do not function as effectively as heat sinks. In addition, there is less permeation of the cement material into the peripheral channels of the honeycomb. The reduced permeation of the cement leads to smaller thermal gradients within the honeycomb structure during its use, and therefore contributes to its thermal shock resistance.

The fired cement composition suitably has a fracture strength in the range of 2 to 8 MPa, preferably 2 to 6 MPa and more preferably from 2.5 to 5 MPa, when measured in accordance with the method described in Example 1 below. In any case, it is preferred that the fracture strength of the fired cement composition is less than that of the ceramic honeycomb.

The fired cement composition suitably has a Young's modulus, measured in accordance with the method described in Example 1 below, in the range of 1 to 10 GPa, preferably from 2 to 8 GPa and more preferably from 3 to 7 GPa.

The CTE of the fired cement composition is preferably within 1 ppm/° C. of that of the ceramic honeycomb.

The fired cement composition has a material thermal shock factor (MTSF) of at least 100. MTSF is a function of fracture strength, as determined by ASTM C1161-94, CTE and Young's modulus, as measured according to ASTM C1259-98, as follows:

$$\text{MTSF} = \text{fracture strength}/(\text{CTE} \times \text{Young's modulus})$$

The units of MTSF are ° C., with higher values indicating better thermal shock resistance. The MTSF in some embodiments is at least 125 or at least 150.

Honeycomb structures prepared in accordance with the invention are useful in a wide range of filtering applications, particularly those involving high temperature operation and/or operation in highly corrosive and/or reactive environments in which organic filters may not be suitable. One use for the filters is in combustion exhaust gas filtration applications, including as a diesel filter and as other vehicular exhaust filters.

Honeycomb structures of the invention are also useful as catalyst supports for use in a wide variety of chemical processes and/or gas treatment processes. In these catalyst support applications, the support carries one or more catalyst materials. The catalyst material may be contained in (or constitute) one or more discriminating layers, and/or may be contained within the pore structure of the walls of the ceramic honeycomb. The catalyst material may be applied to the opposite side of a porous wall to that on which the discriminating layer resides. A catalyst material may be applied onto the support in any convenient method.

The catalyst material may be, for example, any of the types described before. In some embodiments, the catalyst material is a platinum, palladium or other metal catalyst that catalyzes the chemical conversion of $NO_x$ compounds as are often found in combustion exhaust gases. In some embodiments, a product of this invention is useful as a combined soot filter and catalytic converter, simultaneously removing soot particles and catalyzing the chemical conversion of $NO_x$ compounds from a combustion exhaust gas stream, such as a diesel engine exhaust stream.

The following examples are provided to illustrate the invention, but are not intended to limit the scope thereof. All parts and percentages are by weight unless otherwise indicated.

EXAMPLE 1

An uncured cement composition is made by mixing the following components:

| | |
|---|---|
| Alumina[1] | 13.8 parts |
| Bentonite Clay[2] | 3.8 parts |
| Inorganic fibers[3] | 43.1 parts |
| Water | 39.3 parts |

[1]CT 3000 from Almatis, Inc., d50 = 0.5 μm, d90 = 2.0 μm, BET surface area = 7.8 m²/g.
[2]Bentonite 34, Charles B. Chrystal Co., Inc. The particles range in size from 1 to about 500 μm with a d50 in excess of 10 μm. 2 grams of this material swells to at least 20 mL in water.
[3]Fiberfrax Long Staple Fine fiber from Unifrax LLC, Niagara Falls, NY.

The fibers and alumina are dry-blended in a blender for 60 minutes. The clay and the polyethylene glycol are then added and the mixture blended another 5 minutes. The water is then added to the resulting blend and mixed in on the blender for 25 minutes. This produces a foamy, lightweight uncured cement composition that is not self-leveling and does not drip when placed into an open container and held upside down. This cement composition is designated Example 1.

A portion of cement composition Example 1 is applied to the periphery of an acicular mullite honeycomb that has 200 cells per square inch (31 cells/cm²) of cross-sectional area. A vacuum is then applied across the honeycomb for a period of two minutes at ambient temperature to dry the cement composition. The honeycomb is then inspected using scanning electron spectroscopy to determine the extent to which the cement composition has permeated into the honeycomb structure. Permeation is limited solely to the single outermost walls of the honeycomb to which the cement composition has been directly applied.

For comparison, a conventional wet cement composition containing colloidal alumina, water, inorganic fibers and a water-soluble cellulose ether is applied to another specimen of the same honeycomb and dried in the same manner by applying a vacuum. The conventional wet cement composition is seen to have migrated 10 cells into the interior of the honeycomb structure.

The periphery of another specimen of the same honeycomb is coated with cement composition Example 1 and dried for 2 hours at 120° C. No cracking is seen. When this experiment is repeated, except that vacuum is applied during the drying step, the dried cement again shows no cracking. Under these conditions, the conventional wet cement composition exhibits significant cracking, indicating that the conventional wet cement cannot be rapidly dried at these elevated temperatures.

A portion of cement composition Example 1 is cast into 60 mm×150 mm×12 mm plates and dried overnight at 70° C. One of the plates is sanded smooth. The fracture strength of this plate is measured according to ASTM C1421-99; this value is the "green strength" of the cement composition. Other plates are fired at 1000° C. or 1100° C. for two hours. After cooling, the Young's modulus of the fired plates is measured according to ASTM C1259-94, and the fracture strength is measured according to ASTM C1421-99. Porosity of the fired cement is measured according to ASTM 830-00. Results of this testing are as indicated in Table 1.

TABLE 1

Mechanical Properties, Green and Fired Cement Composition Ex. 1

| Fired Fracture Strength (1000° C.), MPa | Fired Young's Modulus, (1000° C.), GPa | Fired Fracture Strength (1100° C.), MPa | Fired Young's Modulus, (1100° C.), GPa | Porosity |
|---|---|---|---|---|
| 4 | 5.2 | 7.1 | 9.1 | 58% |

As shown in Table 1, both strength and modulus increase when the firing temperature is increased from 1000 to 1100° C. The lower strengths seen at the lower firing temperatures are advantageous because in general the strength of a cement or skin should be lower than that of the honeycombs. The data in Table 1 suggests that even lower firing temperatures, such as 900 to 950° C., will be sufficient to produce a cured cement having adequate but not excessive strength for ceramic honeycomb cement and skinning applications. Strength can be reduced further by increasing porosity.

EXAMPLE 2

An uncured cement composition is made by mixing the following components:

| | |
|---|---|
| Alumina[1] | 4.5 parts |
| Bentonite Clay[2] | 1.75 parts |
| Low-biopersistent fibers[3] | 42.0 parts |
| 400 MW Polyethylene glycol | 1.75 parts |
| Water | 50.0 parts |

[1]CT 3000 from Almatis, Inc., d50 = 0.5 μm, d90 = 2.0 μm, BET surface area = 7.8 m²/g.
[2]Bentonite 34, Charles B. Chrystal Co., Inc. 2 grams of this material swells to at least 20 mL in water.
[3]HT-95-SAB-T45 from Morgan Thermal Ceramics. This material contains 5% shot and has a tap density of 0.7 g/cc.

The first four listed ingredients are dry blended on a blender for 60 minutes, and the water is then added to the resulting blend and mixed in on the blender for 30 minutes. This produces a foamy, lightweight uncured cement that is not self-leveling and does not drip when placed into an open container and held upside down. This composition is designated as Example 2.

A portion of cement composition Example 2 is cast into 10 mm thick plates and dried overnight at 120° C. without vacuum. No cracks appear. The green strength of one of the dried plates is measured according to ASTM C1421-99, and found to be 0.75 MPa. Other plates are fired at 950° C. for two hours. After cooling, the modulus, strength and porosity of the fired plates are measured as before. The modulus is 5.39 GPa, the strength is 4.97 MPa and the porosity is 68.5%. In this example, the high porosity of the fired cement is attributable to the somewhat high water content (50% by weight).

EXAMPLES 3 AND 4

Uncured cement composition Examples 3 and 4 are made by mixing the following components. In Example 3, the alumina is the CT3000 product from Almatis, Inc. described in previous examples. In Example 4, the alumina is A16SG from Almatis, Inc. (d50=0.5 μm, d90=2.0 μm, BET surface area=8.9 m²/g).

| Alumina | 3.7 parts |
|---|---|
| Bentonite Clay[1] | 1.5 parts |
| Inorganic fibers[2] | 15.5 parts |
| Water | 31.8 parts |
| Silicon carbide particles[3] | 29.3 parts |
| Porogen[4] | 16.6 parts |
| 400 MW poly(ethylene glycol) | 1.6 |

[1]Bentonite 34, Charles B. Chrystal Co., Inc.
[2]HT-95-SAB-T45 from Morgan Thermal Ceramics.
[3]F1000 from US Abrasives, Northbrook, Illinois. This material contains at least 94% by weight of particles larger than 1 μm, with most particles between 3.7 and 5.3 μm.
[4]A625 carbon flakes from Cummings-Moore.

The cement compositions are prepared in the same general manner as described in Example 2, with all dry ingredients being mixed together before the water is added. Plates are prepared, dried and fired as described in Example 2, and green strength, calcined strength, calcined modulus and porosity are measured as described before. Results are as reported in Table 2 following.

TABLE 2

Mechanical Properties, Green and Fired Cement Composition Ex. 3 and 4

| Example | Green Strength, MPa | Calcined Modulus, GPa | Calcined Strength, MPa | Porosity |
|---|---|---|---|---|
| 3 | 0.82 | 5.14 | 3.47 | 62.6% |
| 4 | 0.65 | 4.85 | 3.68 | 63.5% |

These examples represent preferred formulations that contain a porogen and auxiliary filler particles. The porogen allows for high porosity to be obtained in the fired cement without using high water levels; higher porosities lead to lower calcined strengths and lower material thermal shock factors, each of which is beneficial. The lower water content allows one to obtain green strength values similar to that of Example 2 despite the much lower fiber content of Examples 3 and 4. The calcined strength of 3.4-3.7 MPa of these samples is lower than in Example 2, and represents a more preferred value as the cement is strong enough to perform its adhesive and skinning function while being well below that of the acicular mullite honeycomb.

The auxiliary filler particles permit the amount of the more expensive fibers to be reduced, relative to Examples 1 and 2. In addition, these particles reduce the CTE of the cement to approximately 5.50 ppm/° C. over the temperature range of 200-600° C.; this CTE closely matches that of acicular mullite honeycombs. The MTSF values for Examples 3 and 4 are 123° C. and 138° C., respectively.

EXAMPLE 5

Uncured cement composition Example 5 is made by mixing the following components.

| Alumina[1] | 3.2 parts |
|---|---|
| Bentonite Clay[2] | 4.4 parts |
| Inorganic fibers[3] | 25.1 parts |
| Silicon nitride particles[4] | 23.8 parts |
| Water | 35.9 parts |
| Porogen[5] | 4.8 parts |
| 400 MW poly(ethylene glycol) | 2.8 parts |

[1]A16SG from Almatis, Inc.
[2]Bentonite 34, Charles B Chrystal Co., Inc.
[3]HT-95-SAB- T45 from Morgan Thermal Ceramics.
[4]Grade L412S from HC Stark, Munich, Germany.
[5]Graphite, Asbury Graphite Mills, Asbury, New Jersey.

Cement composition Example 5 is prepared in the same general manner as described in Example 2, with all dry ingredients being mixed together before the water is added. Plates are prepared, dried and fired as described in Example 2, and green strength, calcined strength, calcined modulus and porosity are measured as described before. Results are as reported in Table 3 following.

TABLE 3

Mechanical Properties, Green and Fired Cement Composition Ex. 5

| CTE, ppm/° C. | Green Strength, MPa | Calcined Strength, MPa | Calcined Modulus, GPa | Porosity, % | MTSF, ° C. |
|---|---|---|---|---|---|
| 2.0 | 5.0 | 4.0 | 53 | 248 | |

EXAMPLE 6

Uncured cement composition Example 6 is made by mixing the following components.

| Alumina[1] | 2 parts |
|---|---|
| Bentonite Clay[2] | 3 parts |
| Inorganic fibers[3] | 28.3 parts |
| Cordierite particles[4] | 19 parts |
| Porogen[5] | 11.3 parts |
| 400 MW poly(ethylene glycol) | 1.7 parts |
| Water | 34.7 parts |

[1]A16SG from Almatis, Inc.
[2]Bentonite 34, Charles B Chrystal Co., Inc.
[3]HT-95-SAB-T45 from Morgan Thermal Ceramics.
[4]Pred Materials International, Inc, New York, New York.
[5]A625 carbon flakes from Cummings-Moore.

The cement composition is prepared in the same general manner as described in Example 2, with all dry ingredients being mixed together before the water is added. Plates are prepared, dried and fired as described in Example 2, and green strength, calcined strength, calcined modulus and porosity are measured as described before. Results are as in Table 4.

TABLE 4

Mechanical Properties, Green and Fired Cement Composition Ex. 6

| CTE, ppm/° C. | Green Strength, MPa | Calcined Strength, MPa | Calcined Modulus, GPa | Porosity | MTSF, ° C. |
|---|---|---|---|---|---|
| 5.5 | 1.3 | 2.5 | 2.6 | 64% | 174 |

EXAMPLE 7

Uncured cement composition Example 7 is made by mixing the following components.

| | |
|---|---|
| Alumina[1] | 1.1 parts |
| Bentonite Clay[2] | 3.8 parts |
| Bio-soluble Inorganic fibers[3] | 17.9 parts |
| SiC particles[4] | 33.7 parts |
| Porogen[5] | 13.1 parts |
| 400 MW poly(ethylene glycol) | 1.6 parts |
| Water | 29.0 parts |

[1]A16SG from Almatis, Inc.
[2]Bentonite 34, Charles B Chrystal Co., Inc.
[3]HT-95-SAB-T45 from Morgan Thermal Ceramics.
[4]F1000 from US Abrasives, Northbrook, Illinois.
[5]A625 carbon flakes from Cummings-Moore.

The cement compositions are prepared in the same general manner as described in Example 2, with all dry ingredients being mixed together before the water is added. Plates are prepared, dried and fired as described in Example 2, and green strength, calcined strength, calcined modulus and porosity are measured as described before. Results are as in Table 5.

TABLE 5

Mechanical Properties, Green and Fired Cement Composition Ex. 7

| CTE, ppm/° C. | Green Strength, MPa | Calcined Strength, MPa | Calcined Modulus, GPa | Porosity | MTSF, ° C. |
|---|---|---|---|---|---|
| 5.4 | 1.1 | 4.0 | 4.3 | 62% | 187 |

EXAMPLE 8

Uncured cement composition Example 8 is made by mixing the following components.

| | |
|---|---|
| Alumina[1] | 3.2 parts |
| Bentonite Clay[2] | 4.4 parts |
| Bio-soluble Inorganic fibers[3] | 29.3 parts |
| Cordierite precursor particles[3] | 19.7 parts |
| Water | 33.5 parts |
| Porogen[5] | 7.0 parts |
| 400 MW poly(ethylene glycol) | 2.9 parts |

[1]A16SG from Almatis, Inc.
[2]Bentonite 34, Charles B. Chrystal Co., Inc.
[3]HT-95-SAB-T45 from Morgan Thermal Ceramics.
[4]Pred Materials International, Inc, New York, New York
[5]A625 carbon flakes from Cummings-Moore.

The cement compositions are prepared in the same general manner as described in Example 2, with all dry ingredients being mixed together before the water is added. Plates are prepared, dried and fired as described in Example 2, and green strength, calcined strength, calcined modulus and porosity are measured as described before. Results are as in Table 6.

TABLE 6

Mechanical Properties, Green and Fired Cement Composition Ex. 8

| CTE, ppm/° C. | Green Strength, MPa | Calcined Strength, MPa | Calcined Modulus, GPa | Porosity | MTSF, ° C. |
|---|---|---|---|---|---|
| 5.4 | 1.8 | 4.1 | 3.7 | 64% | 205 |

EXAMPLE 9

Uncured cement composition Example 9 is made by mixing the following components.

| | |
|---|---|
| Alumina[1] | 1.2 parts |
| Bentonite Clay[2] | 3.2 parts |
| Mica platelete[6] | 13.1 parts |
| SiC[4] | 24.7 parts |
| Water | 42.6 parts |
| Porogen[5] | 14.0 parts |
| 400 MW poly(ethylene glycol) | 1.2 parts |

[1]A16SG from Almatis, Inc.
[2]Bentonite 34, Charles B. Chrystal Co., Inc.
[4]F1000 from US Abrasives, Northbrook, Illinois.
[5]A625 carbon flakes from Cummings-Moore.
[6]Micro Mica 3000 Charles B. Chrystal Co.

The cement compositions are prepared in the same general manner as described in Example 2, with all dry ingredients being mixed together before the water is added. Plates are prepared, dried and fired as described in Example 2, and green strength, calcined strength, calcined modulus and porosity are measured as described before. Results are as in Table 7.

TABLE 7

Mechanical Properties, Green and Fired Cement Composition Ex. 9

| CTE, ppm/° C. | Green Strength, MPa | Calcined Strength, MPa | Calcined Modulus, GPa | Porosity | MTSF, ° C. |
|---|---|---|---|---|---|
| 5.0 | 1.0 | 4.5 | 3.9 | 66% | 229 |

EXAMPLE 10

Uncured cement composition Example 10 is made by mixing the following components:

| | |
|---|---|
| Bentonite Clay[2] | 7.9 parts |
| SiC[4] | 29.1 parts |
| Water | 47.1 parts |
| Porogen[5] | 15.9 parts |

[2]Bentonite 34, Charles B. Chrystal Co., Inc.
[4]F1000 from US Abrasives, Northbrook, Illinois
[5]A625 carbon flakes from Cummings-Moore.

The cement composition is prepared in the same general manner as described in Example 2, with all dry ingredients being mixed together before the water is added. Plates are prepared, dried and fired as described in Example 2, and green strength, calcined strength, calcined modulus and porosity are measured as described before. Results are as in Table 8.

TABLE 8

| Green Strength, MPa | Calcined Strength, MPa | Calcined Modulus, GPa | Porosity | MTSF, ° C. |
|---|---|---|---|---|
| 2.4 | 4.2 | 3.8 | 63% | 220 |

EXAMPLE 11

Uncured cement composition Example 11 is made by mixing the following components:

| | |
|---|---|
| Bentonite Clay[2] | 9.1 parts |
| SiC[4] | 33.2 parts |
| Water | 39.7 parts |
| Porogen[5] | 18.1 parts |

[2]Bentonite 34, Charles B. Chrystal Co., Inc.
[4]F1000 from US Abrasives, Northbrook, Illinois
[5]A625 carbon flakes from Cummings-Moore.

The cement composition is prepared in the same general manner as described in Example 2, with all dry ingredients being mixed together before the water is added. Plates are prepared, dried and fired as described in Example 2, and green strength, calcined strength, calcined modulus and porosity are measured as described before. Results are as in Table 9.

TABLE 9

| Green Strength, MPa | Calcined Strength, MPa | Calcined Modulus, GPa | Porosity | MTSF, ° C. |
|---|---|---|---|---|
| 2.4 | 5.3 | 7.1 | 55% | 149 |

EXAMPLE 12

Uncured cement composition Example 12 is made by mixing the following components:

| | |
|---|---|
| Fibers | 19.9 parts |
| Bentonite Clay[2] | 4.6 parts |
| Si$_3$N$_4$ | 36.6 parts |
| Water | 29.4 parts |
| Porogen[5] | 6.0 parts |
| Water reducer | 3.5 parts |

[2]Bentonite 34, Charles B. Chrystal Co., Inc.
[5]A625 carbon flakes from Cummings-Moore.

The cement composition is prepared in the same general manner as described in Example 2, with all dry ingredients being mixed together before the water is added. Plates are prepared, dried and fired as described in Example 2, and green strength, calcined strength, calcined modulus and porosity are measured as described before. Results are as in Table 10.

TABLE 10

| CTE, ppm/° C. | Green Strength, MPa | Calcined Strength, MPa | Calcined Modulus, GPa | Porosity | MTSF, ° C. |
|---|---|---|---|---|---|
| 4.9 | 3.7 | 5.8 | 4.6 | 51% | 253 |

EXAMPLE 13

Uncured cement composition Example 13 is made by mixing the following components:

| | |
|---|---|
| Fibers | 18.2 parts |
| Bentonite Clay[2] | 3.7 parts |
| SiC[4] | 34.0 parts |
| Alumina | 1.2 parts |
| Water | 29.7 parts |
| Porogen[5] | 13.2 parts |

[2]Bentonite 34, Charles B. Chrystal Co., Inc.
[4]F1000 from US Abrasives, Northbrook, Illinois
[5]A625 carbon flakes from Cummings-Moore.

The cement composition is prepared in the same general manner as described in Example 2, with all dry ingredients being mixed together before the water is added. Plates are prepared, dried and fired as described in Example 2, and green strength, calcined strength, calcined modulus and porosity are measured as described before. Results are as in Table 11.

TABLE 11

| CTE, ppm/° C. | Green Strength, MPa | Calcined Strength, MPa | Calcined Modulus, GPa | Porosity | MTSF, ° C. |
|---|---|---|---|---|---|
| 5.4 | 1.7 | 7.4 | 8.3 | 59% | 177 |

EXAMPLES 14-20

Uncured cement composition Examples 14-20 are prepared for rheological testing from the ingredients listed in Table 12.

TABLE 12

| | Ingredient | | | | | |
|---|---|---|---|---|---|---|
| | Alumina[1] | Fibers[2] | Water | SiC[3] | Bentonite Clay[4] | PEG 400[5] | Carbon Black[6] |
| | Parts by Weight | | | | | | |
| Ex. 14 | 0 | 14.0 | 37.0 | 26.4 | 6.4 | 1.3 | 15.0 |
| Ex. 15 | 6.6 | 14.3 | 32.2 | 26.9 | 3.4 | 1.4 | 15.3 |
| Ex. 16 | 3.3 | 15.0 | 32.8 | 28.2 | 3.3 | 1.4 | 16.0 |
| Ex. 17 | 6.2 | 12.4 | 37.2 | 23.4 | 6.2 | 1.2 | 13.3 |
| Ex. 18 | 3.0 | 12.8 | 39.1 | 24.2 | 6.0 | 1.2 | 13.7 |
| Ex. 19 | 0 | 15.5 | 33.9 | 29.2 | 3.3 | 1.5 | 16.6 |
| Ex. 20 | 1.1 | 15.3 | 33.9 | 28.9 | 3.0 | 0 | 17.9 |

[1]CT 3000 from Almatis, Inc.
[2]HT90-SAB-T45 low biopersistent fibers from Morgan Thermal Ceramics.
[3]UK Abrasives, Inc., Northbrook IL.
[4]Bentonite 34, Charles B. Chrystal Co., Inc.
[5]400 molecular weight polyethylene glycol.
[6]Asbury Graphite Mills, Asbury NJ.

Rheological properties of each of these uncured cement compositions are evaluated using an oscillating shear rheometry method that employs a capillary rheometer apparatus. The capillary used for the tests is has an internal diameter of 4 mm and a length of 120 mm. The piston diameter is 4.5 cm, the piston area is 15.93 cm$^2$, and the stroke length is 7.62 cm. A flow rate of 7.486 cm$^3$/minute is used to measure extrusion pressure. Oscillating shear is applied at 1 rad/s oscillation and 5 MPa amplitude. The material temperature is 20° C. Viscosity and yield pressure are computed from the extrusion pressure. These values, together with the measurement temperature, are as reported in Table 13.

In addition, the cement compositions are visually observed to see whether they are self-supporting or flow under their own weight. All of the compositions are self-supporting, even when the viscosity is as low as about 4 Pa·s.

TABLE 13

| Property | Temperature, °C. | Yield pressure, pKa | Viscosity, Pa · s | Self-Supporting? |
|---|---|---|---|---|
| Ex. 14 | 21.0 | 31.0 | 27.9 | Yes |
| Ex. 15 | 21.4 | 46.2 | 38.2 | Yes |
| Ex. 16 | 21.0 | 57.9 | 24.2 | Yes |
| Ex. 17 | 20.4 | 82.0 | 34.3 | Yes |
| Ex. 18 | 20.8 | 45.5 | 18.9 | Yes |
| Ex. 19 | 21.0 | 28.9 | 12.1 | Yes |
| Ex. 20 | 22.1 | 7.6 | 3.7 | Yes |

What is claimed is:

1. An uncured inorganic cement composition comprising:
   a) 1 to 18% by weight of a water-swellable clay;
   b) 20 to 70% by weight of non-water-swellable, non-fugitive, inorganic filler particles that have an equivalent diameter of greater than 250 nm;
   c) 20 to 60% by weight of water;
   d) larger than to less than 0.05% by weight of a water-soluble cellulosic polymer;
   e) Larger than 0 to less than 0.25% by weight of inorganic particles having an equivalent diameter of 250 nm or less; and
   f) 5 to 30% by weight of one or more porogens;
   wherein the uncured cement composition is self-supporting with a shear viscosity of 1 to less than 28 Pa*s when measured by oscillating shear rheometry methods at 20° C., 1 rad/s oscillation and 5 MPa amplitude.

2. The uncured inorganic cement composition of claim 1, wherein the water-swellable clay expands to a volume of at least 15 mL when 2 grams of the clay are added in small increments to room temperature distilled water.

3. The uncured inorganic cement composition of claim 1, which contains from 1 to 7 wt-% of the water-swellable clay.

4. The uncured inorganic cement composition of claim 1, wherein the inorganic filler particles include at least one high aspect ratio filler having an aspect ratio of 5 or greater.

5. The uncured inorganic cement composition of claim 4 which contains from 10 to 45 wt-% of the at least one high aspect ratio filler having an aspect ratio of 5 or greater.

6. The uncured inorganic cement composition of claim 4 wherein the at least one high aspect ratio filler having an aspect ratio of 5 or greater is a low-biopersistent fiber.

7. The uncured inorganic cement composition of claim 1 wherein the inorganic filler particles include alumina.

8. The uncured inorganic cement composition of claim 7 wherein the alumina and water-swellable clay are present in a weight ratio of from 0.25 to 2 parts of alumina to one part clay.

9. The uncured inorganic cement composition of claim 8 wherein the alumina and water-swellable clay are present in a weight ratio of from 0.3 to 1 part of alumina to one part clay.

10. The uncured inorganic cement composition of claim 7 wherein the alumina and water-swellable clay together constitute from 3 to 15 wt-% of the composition.

11. The uncured inorganic cement composition of claim 7 which contains from 10 to 35% by weight of low aspect ratio particles having an aspect ratio of less than 5 other than alumina or a water-swellable clay.

12. The uncured inorganic cement composition of claim 1 which includes:
   a) 1 to 7% by weight of the water-swellable clay;
   b) 0.75 to 4 parts by weight, per part by weight of the water-swellable clay, of alumina particles that have an effective diameter greater than 250 nm;
   c) 10 to 70% by weight of inorganic filler particles that have an aspect ratio of at least 10;
   d) 20 to 60% by weight of water;
   e) greater than 0 to less than 0.05% by weight of a water-soluble cellulosic polymer;
   f) greater than 0 to less than 0.25% by weight of inorganic particles having an equivalent diameter of 250 nm or less; and
   g) 10 to 25% by weight of the one or more porogens;
   wherein the composition is devoid of colloidal sol;
   wherein uncured cement composition is self-supporting with a shear viscosity of 3 to less than 10 Pa·s when measured by oscillating shear rheometry methods at 20° C., 1 rad/s oscillation and 5 MPa amplitude.

13. The uncured inorganic cement composition of claim 1 which has a shear viscosity of 3 to 10 Pa·s when measured by oscillating shear rheometry methods at 20° C., 1 rad/s oscillation and 5 MPa amplitude.

14. A method of forming a honeycomb structure comprising forming a layer of the uncured inorganic cement composition of claim 1 on at least one surface of a ceramic honeycomb having porous walls and then firing the uncured inorganic cement composition and the ceramic honeycomb to form a cured cement layer on said at least one surface of the ceramic honeycomb.

15. The method of claim 14, wherein the cured cement layer forms a peripheral skin on the ceramic honeycomb.

16. The method of claim 14, wherein the cured cement layer forms a cement layer between segments of a segmented honeycomb structure.

17. The method of claim 14, wherein fired cement composition has a CTE over the temperature range of 100° C.-600° C. that is within the range $CTE_{honeycomb}+1$ ppm/° C. to $CTE_{honeycomb}-5$ ppm, where $CTE_{honeycomb}$ is the coefficient of thermal expansion of the honeycomb.

18. The method of claim 17 wherein the inorganic filler particles include low-biopersistent inorganic fibers and low aspect ratio particles other than alumina or a water-swellable clay which have a CTE equal to or lower than that of the ceramic honeycomb.

19. The uncured cement composition of claim 1, wherein the one or more porogens is wheat flour, wood flour, soy flour, potato starch, corn starch, corn meal, cellulose flour, and/or nut shell flour.

* * * * *